United States Patent
Gottlieb et al.

(10) Patent No.: US 9,130,982 B2
(45) Date of Patent: Sep. 8, 2015

(54) SYSTEM AND METHOD FOR REAL-TIME REPORTING OF ANOMALOUS INTERNET PROTOCOL ATTACKS

(71) Applicant: TT GOVERNMENT SOLUTIONS, INC., Piscataway, NJ (US)

(72) Inventors: Yitzchak Gottlieb, Edison, NJ (US); Aditya Naidu, Edison, NJ (US); Abhrajit Ghosh, Edison, NJ (US); Akira Yamada, Fujimino (JP); Yukiko Sawaya, Fujimimo (JP); Ayumu Kubota, Fujimino (JP)

(73) Assignee: Vencore Labs, Inc., Basking Ridge, NJ (US)

( * ) Notice: Subject to any disclaimer, the term of this patent is extended or adjusted under 35 U.S.C. 154(b) by 81 days.

(21) Appl. No.: 13/916,693

(22) Filed: Jun. 13, 2013

(65) Prior Publication Data

US 2013/0340079 A1    Dec. 19, 2013

Related U.S. Application Data

(60) Provisional application No. 61/659,692, filed on Jun. 14, 2012.

(51) Int. Cl.
*H04L 29/00* (2006.01)
*H04L 29/06* (2006.01)

(52) U.S. Cl.
CPC ......... *H04L 63/1416* (2013.01); *H04L 63/1458* (2013.01)

(58) Field of Classification Search
CPC .................. H04L 63/1416; H04L 63/1458
See application file for complete search history.

(56) References Cited

U.S. PATENT DOCUMENTS

| | | | |
|---|---|---|---|
| 7,808,916 B1 * | 10/2010 | Futamura et al. | 370/242 |
| 2002/0045435 A1 | 4/2002 | Fantaske | |
| 2002/0166071 A1 | 11/2002 | Lingafelt et al. | |
| 2006/0036727 A1 * | 2/2006 | Kurapati et al. | 709/224 |
| 2006/0075084 A1 | 4/2006 | Lyon | |
| 2008/0028467 A1 | 1/2008 | Kommareddy et al. | |
| 2008/0162679 A1 * | 7/2008 | Maher et al. | 709/223 |
| 2011/0167493 A1 | 7/2011 | Song et al. | |
| 2011/0302653 A1 | 12/2011 | Frantz et al. | |
| 2013/0145473 A1 * | 6/2013 | Cormode et al. | 726/26 |

OTHER PUBLICATIONS

International Search Report and Written Opinion, International Application No. PCT/US2013/45551, mailing date Jan. 10, 2014.

* cited by examiner

*Primary Examiner* — Jeff Pwu
*Assistant Examiner* — Helai Salehi
(74) *Attorney, Agent, or Firm* — Heslin Rothenberg Farley & Mesiti P.C.

(57) ABSTRACT

A system and a method for detecting anomalous attacks in Internet network flow operate by counting a number of Internet traffic messages that are detected as anomalous attacks to provide a count; computing a running average of the number of messages that are detected as anomalous attacks; and comparing the count to the running average to provide an anomalous attack alarm if the count is greater than a multiple of the running average. The attacks can include at least one of spoofing attacks or denial of service attacks. A computer readable storage medium stores instructions of a computer program, which when executed by a computer system, results in performance of steps of the method.

26 Claims, 5 Drawing Sheets

SYSTEM AND METHOD FOR REAL-TIME REPORTING OF ANOMALOUS INTERNET PROTOCOL ATTACKS

CROSS-REFERENCED APPLICATION

This application claims priority from and benefit of provisional patent application Ser. No. 61/659,692, filed on Jun. 14, 2012, which is incorporated herein by reference, in its entirety, for all purposes.

BACKGROUND OF THE DISCLOSURE

1. Field of the Disclosure

The present disclosure generally relates to the detection of spoofing and denial of service (DoS) attacks on networks. More particularly, the disclosure relates to reliably determining whether an attack is occurring or has occurred.

2. Description of the Related Art

A significant problem in Internet security is detecting network attacks that use source-spoofed Internet Protocol (IP) traffic. The purpose of detecting these attacks is to give a network operator warning that defensive actions should be taken and that hosts on the network may be compromised. Others have tried to solve the problem of detecting spoofed packets by different means and have built or proposed filters for dropping packets that are determined to be spoofed.

Some approaches to dealing with this problem are discussed in M. Nagaratna, V. K. Prasad and S. T. Kumar, "Detecting and Preventing IP-spoofed DDoS Attacks by Encrypted Marking Based Detection and Filtering (EMDAF)," in International Conference on Advances in Recent Technologies in Communication and Computing, Kottayam, Kerala, 2009. Other approaches are discussed in K. Levitt and S. Templeton, "Detecting Spoofed Packets," in Proceedings of The Third DARPA Information Survivability Conference and Exposition, Washington, D.C. USA, 2003. Further approaches are discussed in X. Yang, "A DoS-limiting Network Architecture," in ACM SIGCOMM, Philadelphia, Pa. USA, 2005.

Conventional techniques do not provide a system or method for monitoring traffic to reliably determine when an attack occurs so as to alert the operator of the network or sub-network so that defensive measures can be initiated. There is a need for such a system.

SUMMARY OF THE DISCLOSURE

Prior solutions provide the tools to detect and filter individual packets, but do not determine the level at which the quantity of spoofed IP packets constitutes an attack that should be reported to network administrators. This is important in the context of large Internet Service Provider (ISP) monitoring since there is always a low level of traffic that appears spoofed (i.e. either because it is spoofed or due to false positives in the spoof-detection algorithm). Reporting all of this traffic to an operator would cause too many alarms and would hinder the operator's response.

While the prior solutions typically provide methods of detecting whether a given packet has a spoofed source address, the present disclosure uses those methods to provide alerts to the network operator that a too-large number of such packets have been observed for a given destination subnet. Thus, this disclosure is directed to the operational benefit of using the results of detection, not the detection itself.

The present disclosure couples anomalous traffic detection techniques generally, and IP spoof-detection software with a self-adjusting, real-time filtering anomaly detector to detect attacks and to overcome the deficiencies of the prior art.

The disclosure is directed to a system for monitoring Internet traffic, comprising a first apparatus for detecting Internet traffic messages that are recognized as anomalous attacks; a counter for counting the Internet traffic messages that are recognized as the anomalous attacks to provide a count; a second apparatus for computing a running average of the number of Internet traffic messages that are recognized as anomalous attacks; and a comparator for comparing the count to the running average and to provide an anomalous attack alarm if the count is greater than a multiple of the running average.

The anomalous attack alarm is terminated if the count is less than a second multiple of the running average, wherein the second multiple is a smaller multiple than the first multiple. The running average is updated using smoothing, which is preferably exponential smoothing.

The running average is updated no more frequently than at a predefined interval, and is set to always be a positive number.

The system can further comprise a database for storing records of anomalous attacks. The processor can determine whether a record of an anomalous attack has been in the database for a predetermined period of time, at which time that record is not used in a window to compute the running average.

The anomalous attacks can comprise at least one of source spoofing and denial of service attacks, as well as other attacks. The anomalous attacks can be recognized based on indicators including source spoofing, SYN ratio, source IP diversity, IP geolocation diversity and IP address list The disclosure is also directed to a system for monitoring Internet traffic, comprising a processor which performs the steps of detecting anomalous attacks in a network flow; counting a number of Internet traffic messages that are detected as anomalous attacks to provide a count; computing a running average of the number of Internet traffic messages that are detected as the anomalous attacks; comparing the count to the running average; and providing an anomalous attack alarm if the count is greater than a multiple of the running average.

The disclosure is further directed to a method for monitoring Internet traffic comprising receiving a network flow and detecting anomalous attacks in the network flow; counting a number of Internet traffic messages that are detected as anomalous attacks to provide a count; computing a running average of the number of messages that are detected as anomalous attacks; and comparing the count to the running average to provide an anomalous attack alarm if the count is greater than a multiple of the running average. The method can further comprise terminating the alarm if the count is less than a second multiple of the running average, wherein the second multiple is a smaller multiple than the multiple of the running average. The method can further comprise updating the running average using smoothing, which can be exponential smoothing.

In accordance with the method, the running average can be updated no more frequently than at a predefined interval. Further, the running average can be set to be a positive number.

The method can further comprise storing in a database, records of anomalous attacks, and determining whether a record of an anomalous attack has been in the database for a predetermined period of time, as well as removing the record from a window used to compute the running average when the record has been in the database for a time greater than the predetermined period of time.

In accordance with the method, the anomalous attacks can comprise at least one of source spoofing and denial of service attacks, as well as other attacks. The anomalous attacks can be recognized based on indicators including source spoofing, SYN ratio, source IP diversity, IP geolocation diversity and IP address list.

The disclosure is also directed to a computer readable non-transitory storage medium storing instructions of a computer program which when executed by a computer system results in performance of steps of a method, comprising receiving a network flow and detecting anomalous attacks in the network flow; counting a number of Internet traffic messages that are detected as anomalous attacks to provide a count; computing a running average of the number of messages that are detected as anomalous attacks; and comparing the count to the running average to provide an anomalous attack alarm if the count is greater than a multiple of the running average.

BRIEF DESCRIPTION OF THE DRAWINGS

A component or a feature that is common to more than one drawing is indicated with the same reference number in each of the drawings.

DESCRIPTION OF THE EMBODIMENTS

Figure 1:
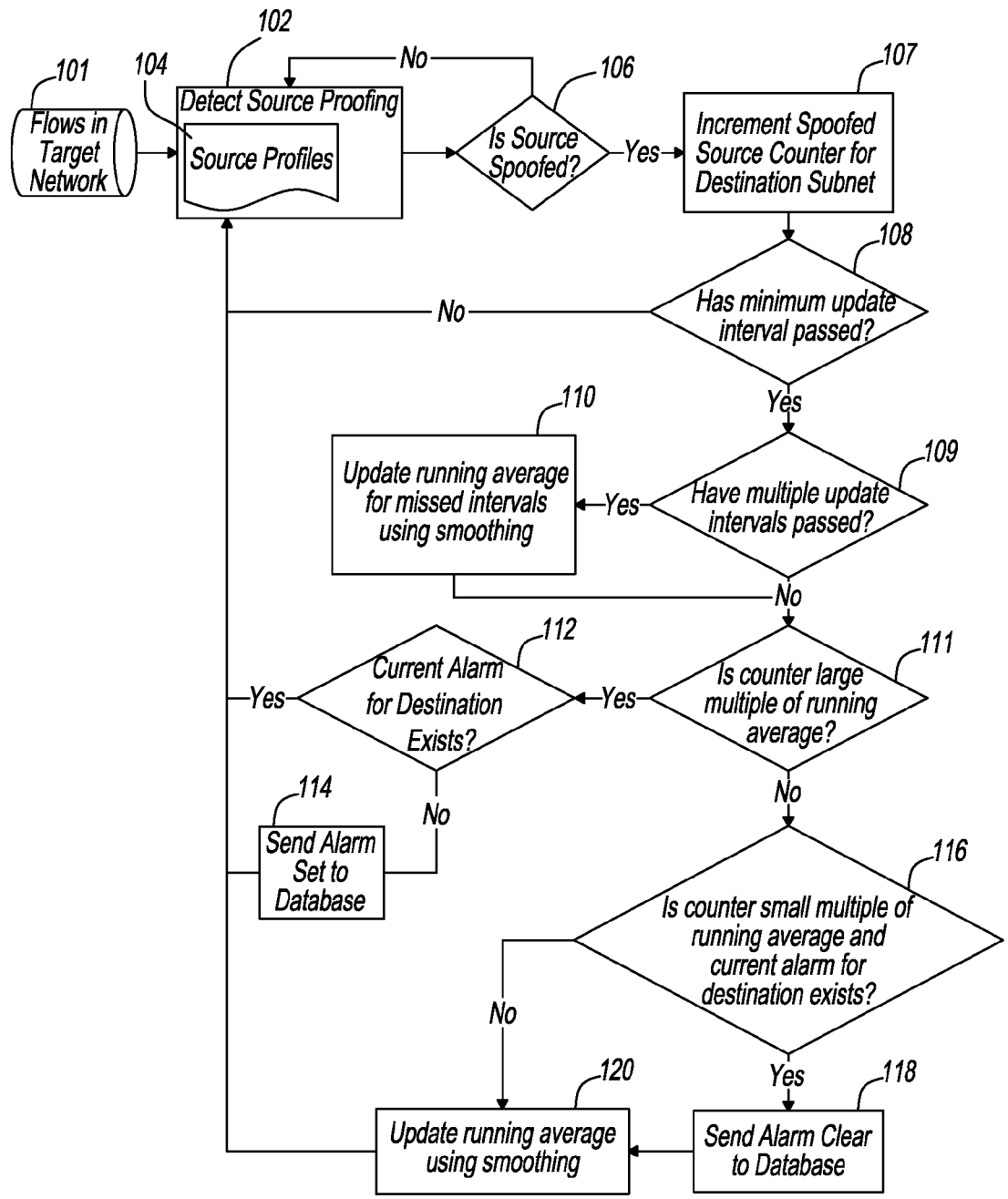
FIG. 1 is a flow chart of a system operating according to the present disclosure

FIG. 1 shows the operation of an embodiment disclosed herein. While this embodiment is described in relation to the detection of spoofed source IP address, it will be understood, as described below, that other anomalous occurrences may be monitored.

At 101, data about flows from the network (generally in the form of NetFlow and sFlow records) is sent from existing network monitoring agents. At 102, source spoofing is detected. For each record, the system determines whether the source IP address is spoofed or not. This can be done, for example, by using source profiles 104 and expected autonomous system (AS) sets, as disclosed in Vaidyanathan, R., Ghosh, A., Yuu-Heng Cheng, Yamada, A. and Miyake, Y., "On the use of BGP AS numbers to detect spoofing." In 2010 IEEE GLOBECOM Workshops (GC Workshops), pp. 1606-1610. Miami, Fla. USA, 2010). However, any method for detecting spoofed IP addresses could potentially be applicable.

At 106, a determination is made as to whether the source address for an item in the flow was spoofed. If it was not spoofed, then flow returns to 102. If at 106, it is determined that an item was spoofed, a counter is incremented at 107. The counter records the number of spoofed source addresses seen by the destination subnet within a current interval. This interval is known as the short-term window.

At 108, the system ensures that the running average is updated no more quickly than a defined parameter, the update interval. Typically, the update interval is preferably one second. The value can be any positive number. It is preferably implemented as a double-precision floating point number. The number is independent of the network being monitored.

At 109, a determination is made as to whether multiple update intervals have passed. At 110, if multiple update intervals have passed, the running average is updated for missed intervals using smoothing. Thus, the system updates the average only when a record for the destination enters or falls out of the short-term window. The system ensures that when a running average that has not been updated in at least one update interval is updated, it is first updated with its current value for each of the missing update intervals. The system ensures that the running average is never set to zero, but is at least a small positive value. The system then continues processing the next record.

At 111, a determination is made as to whether the number of spoofed attacks in the short-term window is larger than a pre-defined multiple X (which is the upper alarm threshold), of a saved running average, where typical values for X are, for example only, 1.25, 1.5, 2, and 3. At 112, a determination is made as whether there is a current alarm for the destination net or subnet. At 114, if there is no current alarm for the destination subnet, the system posts an alarm to the database, and the record of the spoof attempt is stored in a database. Flow then returns to 102. At 116, a determination is made as to whether the number of spoofed attacks is less than a second pre-defined multiple Y, an upper clear threshold, and whether there is a current alarm for the destination subnet. Typical values for Y are 1, 1.1, 1.25, where Y is less than or equal to X. While there is latitude in the values chosen for X and Y, as a practical matter, X and Y are defined as double precision floating values, where for operational reasons, X should be greater than 1.0 and Y must be less than or equal to X. There are no hard rules for determining X and Y. An operator can decide these values based on expected traffic spikes and the number of acceptable false alarms. While the size of the network may be a factor in the operator's choice of values, the values are typically chosen to match an intuitive notion of what would be representative of much greater than average variability in the traffic.

At 118, if the number of spoofed attacks is less than the second pre-defined multiple, and there is a current alarm for the destination subnet, then an alarm clear is sent to the database, and the alarm is cleared from the database. At 120, the running average is updated using smoothing. Flow returns to 102. If at 116, the number of spoofed attacks is more than the second pre-defined multiple, or there is a no current alarm for the destination subnet, then flow proceeds directly to 120 to update the running average using smoothing, and then on to 102.

At 120, if there is no current alarm for the destination subnet in the database, the system uses the value in the short-term window to update the running average, preferably by using single exponential smoothing. A user-specified value $\alpha$ (between 0 and 1) is selected and updates the long-term value (L) by multiplying the current short-term value (S) by $\alpha$ and adding it to the product of previous version of L and $1-\alpha$. This is represented symbolically as: $L = S \times \alpha + L_{previous} \times (1-\alpha)$. At the start of operations the system uses a user-defined value known as the long-term value as the initial value of L. The system compares against the long-term value before the end of the first user-defined interval known as the "long term duration" even while it updates L. After the long-term duration, the system uses the computed L for comparison. The update interval is typically and preferably one second. The value can be any positive number, and can be implemented as a double-precision floating point number. The number is independent of the network being monitored.

The data entering at 102 can either be new flows from the network or old flows that have fallen out of the window. For new flows, the counter at 107 is incremented. For old (expired) flows the counter is decremented. The alarm processing (steps after 107) is the same for records entering the window as it is for those exiting the window.

Figure 2:
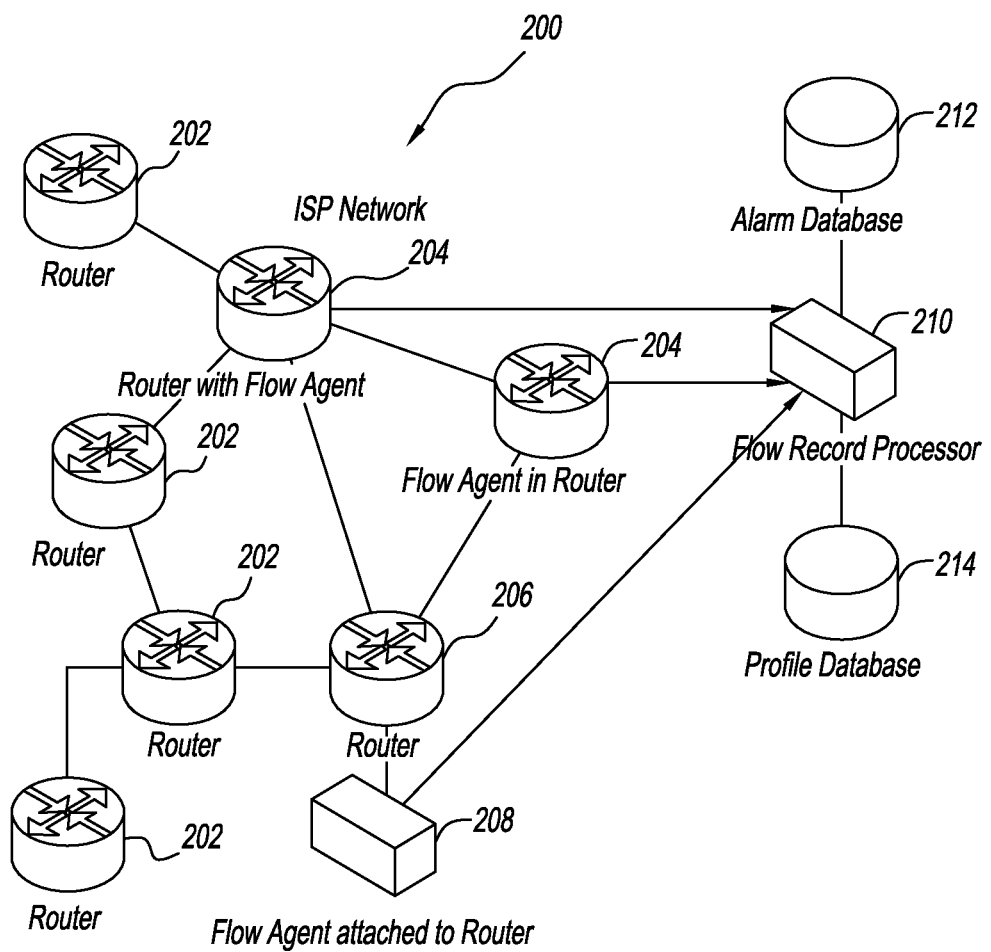
FIG. 2 is a schematic representation of a system architecture according to the present disclosure.

FIG. 2 illustrates a system in which the disclosed embodiment is implemented. An Internet Service Provider (ISP) network, shown generally at 200, contains routers 202 that forward traffic through the network to the hosts at the network edge. Some of these routers 204 may have internal flow agents. Other routers 206 are implemented in conjunction with these flow agents 208. Flow agents 208 monitor the network, collect data (such as IP addresses, port numbers, and amount of traffic), and send this data to a flow record processor 210. An alarm database 212 and a profile database 214 are associated with flow record processor 210.

Figure 3:
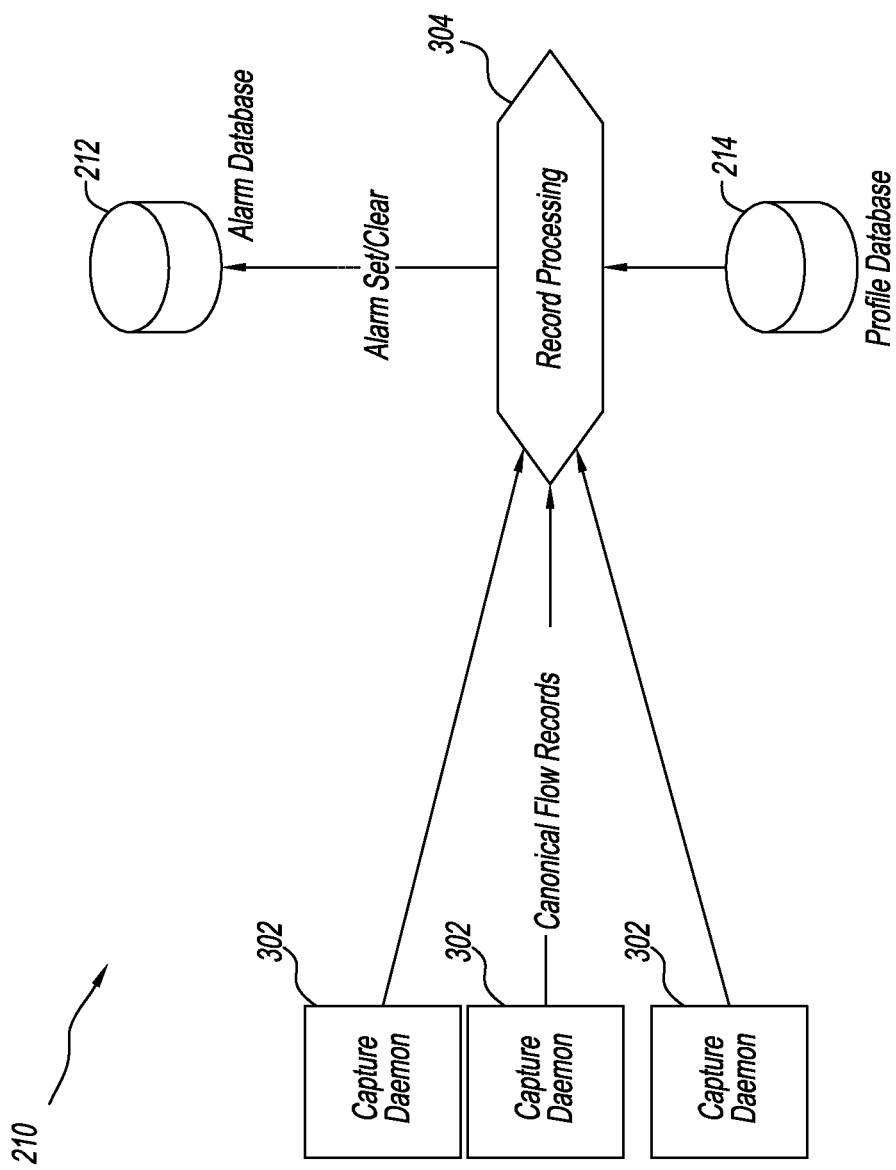
FIG. 3 is a schematic representation of the flow record processing according to the present disclosure.

Referring to FIG. 3, flow record processor 210 is composed of capture daemons 302. In one implementation, one capture daemon is used for each flow agent 206 and 208. The capture daemons 302 convert flow records from their native form (NetFlow or sFlow records) to a canonical form. Flow record processor 210 also includes a record processing component 304, which processes the canonical records as described with respect to FIG. 1.

Figure 4:
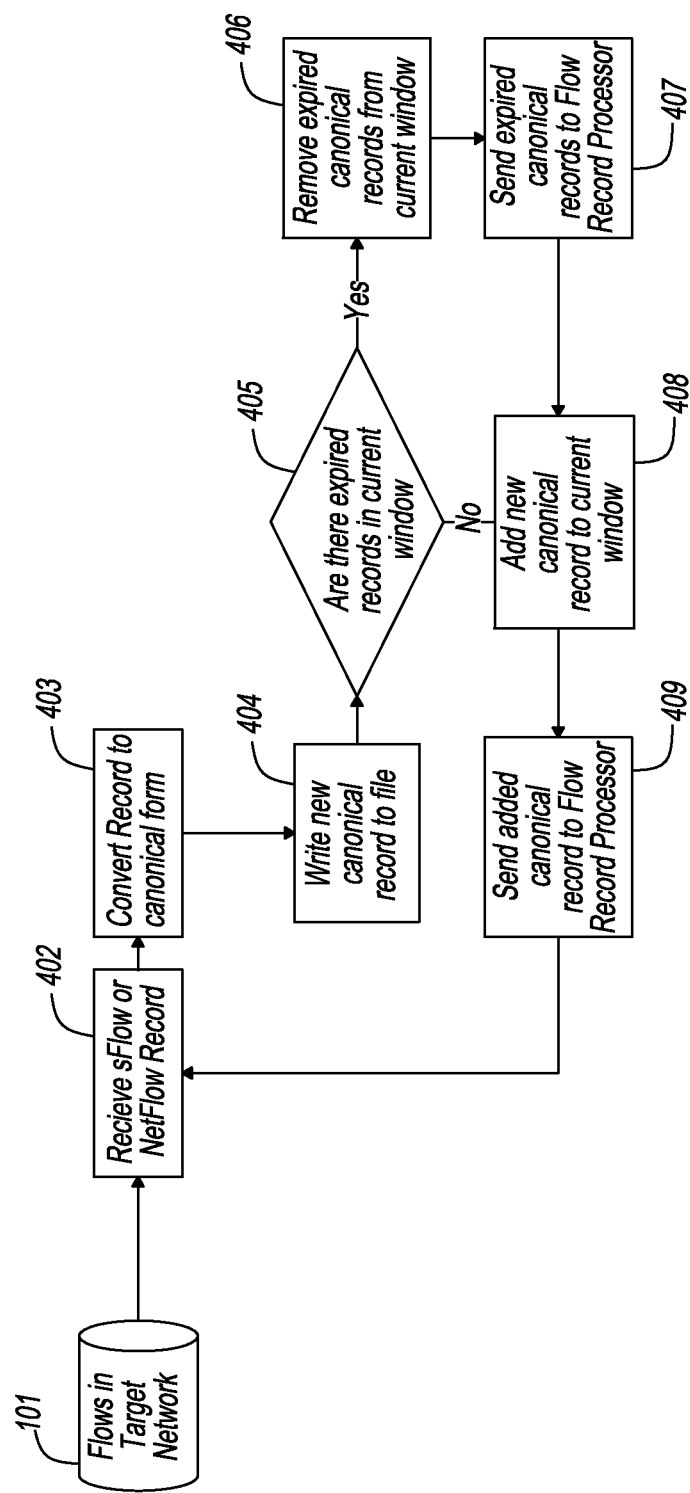
FIG. 4 is a flow chart illustrating the operation of the capture daemons of FIG. 3.

Referring to FIG. 4, at 101, the capture daemons receive flows in the target network 101 by receiving network flow monitoring data at 402 in their native format. At 403 the flows are converted to a canonical format used in the described system. There are capture daemons for sFlow agents and for NetFlow agents. In general, each capture daemon can convert only one type of record. The capture daemon starts and listens for incoming records (either sFlow or NetFlow) from an agent configured to send its records to that capture daemon. Upon receiving a native record, the capture daemon extracts from that record the data necessary to create a canonical record and creates the canonical record. At 404, the capture daemon then records the canonical record by writing it to a file. At 405, the capture daemon then determines if there are canonical records in its current window that have expired; that is that are older than some predetermined threshold. At 406, if there are expired records in the file, the capture daemon removes those records from the current window. At 407, the expired canonical records are sent to record processing at 304 (FIG. 3) with a notation that these records have expired. At 408, the capture daemon then adds the new canonical record to the current window. At 409, capture daemon sends a copy to record processing at 304 with a notation that this record is newly entering the window. The capture daemon resumes processing incoming native records at 402.

The operation of the capture daemons is innovative in that most capture daemons only save data to a file, so that the records they capture can be analyzed only periodically when the complete file is written, as opposed to processed in real time by another application, as is the case in the system described herein.

Embodiments of the system and method described herein include self-adjusting, real-time filtering capabilities. Embodiments of the system and method described herein can be used for anomalies other than spoofed IP addresses such as Denial-of-Service (DoS) attacks. In the case of denial of service attacks, the running average consists not of the number of spoofed IP packets, but either of the total number of packets, the number of bytes in the total number of packets or the number of flows corresponding to those packets. The processing from 107 on is identical.

Other indicators of anomalous IP attacks that can be utilized in the system described herein are noted below. The frequency of occurrence of different events or parameters is monitored by the system.

SYN Ratio Indicator

TCP based applications require the establishment of a connection between a client and a server using a 3-way handshake protocol. The handshake is initiated by the client who sends the server a TCP packet with the SYN flag set (aka SYN packet). A successful connection results in the exchange of non-SYN (data) packets over the established connection between the server and clients. A typical bot-based DoS attack sends a large number of SYN packets to a server. Each SYN packet in the SYN flood results in the allocation of TCP state at the server and a SYN-ACK sent to the client. The attacking bots do not respond to the SYN-ACK thus consuming resources at the server.

The SYN ratio indicator provides an early warning of DoS attacks by considering the volume of SYN packets relative to the overall volume of TCP traffic to a server. A SYN flood attack could be distinguished from a so-called flash crowd because a SYN flood would have a significantly higher ratio of SYN packets. The SYN ratio indicator maintains counters of observed SYN and non-SYN traffic within each time window. It also maintains long-term rates of observed SYN-traffic to observed non-SYN traffic across multiple time windows. Rates computed for a given time window are compared against the current long-term rate to determine whether an alert needs to be raised. In case no alert is raised for a given time window, the computed rate for the time window is used to update the long term rate.

Source IP Diversity Indicator

A botnet originated DDoS attack typically uses a large number of bots to overwhelm a target. In addition, many botnets may also employ random source IP address spoofing to hide the location of individual bots. It is thus possible that during a large scale DDoS attack the number of unique source IP addresses for a given destination IP may be quite large relative to normal operations. It may be possible to provide early warning of DDoS/RDDoS attacks by considering the number of unique source IP addresses observed within a time window for a given destination IP address. The source IP diversity Indicator maintains counters of observed unique source IP addresses over each time window to allow computation of a short term source IP diversity rate for a given destination. Short term source IP diversity is used in conjunction with a long term source IP diversity rate in a manner similar to the SYN ratio Indicator above to determine whether Alerts should be raised.

IP Geolocation Diversity Indicator

DDoS attacks may employ bots located in geographically diverse regions. Therefore it is expected that the number of unique geographical areas from which traffic is observed for a destination could be relatively large when a DDoS attack is in progress. Given a source IP address, it is possible to obtain a coarse grained measure of its geographical location either from a whois server or from the RIR delegated IP address lists. The IP Geolocation Diversity Indicator maintains a count of the unique geographical locations from where traffic is observed for a given destination within the current time window. As before, this is compared against a long term rate to determine the presence of geolocation anomalies for the given destination.

IP Address List Indicator

Blacklists containing IP addresses of known malicious traffic sources are publicly available from various trusted providers. Typically these lists identify either specific IP addresses or IP address subnets that are known to originate malicious traffic. The IP Address List Indicator analyzes the presence of IP addresses from these lists in observed flow data. An instance of this Indicator is associated with a particular IP address list that is provided as configuration input.

Alert generation and long term rate computation is performed using a time window based analysis approach similar to the one described for the previous Indicators. In addition to the above, pure volume based indicators that are computed in terms of packet, byte and flow counts acquired from flow records can be used. As with the previously listed Indicators, these volume-based Indicators compute data volumes per time window and maintain long term trends against which to compare per time window behavior. For example, large occurrences of the SYN Ratio, Source IP Diversity and Rate based indicator alerts could indicate the occurrence of a SYN flood based DDoS attack. Large occurrences of SYN Ratio, Spoofed Source and Rate based indicator alerts could indicate the presence of a spoofed SYN flood attack. Large occurrences of Spoofed Source, Rate based and Source IP Diversity indicators could indicate a DoS attack with random spoofing.

Destination IP Specific

An analyst can filter alerts based on destination IP addresses or destination IP prefixes of interest in conjunction with some subset of indicator types. If a certain destination IP is known to be under attack or expected to be attacked, monitoring indicator activity would help determine the nature of the attack and thereby the appropriate mitigation mechanism. Thus a small number of Source IP Diversity Indicator alerts but a large number of Rate based indicator alerts for a destination could indicate that traffic from a small number of sources is causing a DDoS. Possible mitigation mechanisms could include so called blackholing only for selected source addresses.

It is noted that the present disclosure focuses on the use of the detection instead of the detection mechanism itself. The system and method described herein uses the detection of individual spoofed packets, or other anomalous events, to monitor the security of the destination subnet. The present disclosure recognizes that spoof detectors, or other anomalous event detectors, will have some number of false positives (i.e. they will declare a certain percentage of packets as spoofed even if they are not). The present disclosure can detect an attack even in the presence of a given percentage of false positive detections. The present disclosure assumes that there will always be a certain number of anomalous packets detectable in the network. This assumption allows the present system to be used on a large-scale network to detect major attacks on destination subnets.

Thus, the system and method disclosed herein allow an operator to detect an attack to a specific destination subnet of interest instead of just individual spoofed packets. This is advantageous for a large network operator (i.e. Tier I ISP) where the volume of individual spoofed packets may overwhelm the operator. The attack detection is based on a running average of network conditions, so it can adjust to gradual changes in network traffic.

An ISP can use the system and method disclosed herein to monitor its own network to detect incipient or on-going attacks. An ISP can also use the system and method disclosed herein to provide an additional service to its customers to detect incipient or on-going attacks on the customers' network. The system and method are also of use to TCP/IP network equipment vendors with product for network monitoring.

Figure 5:
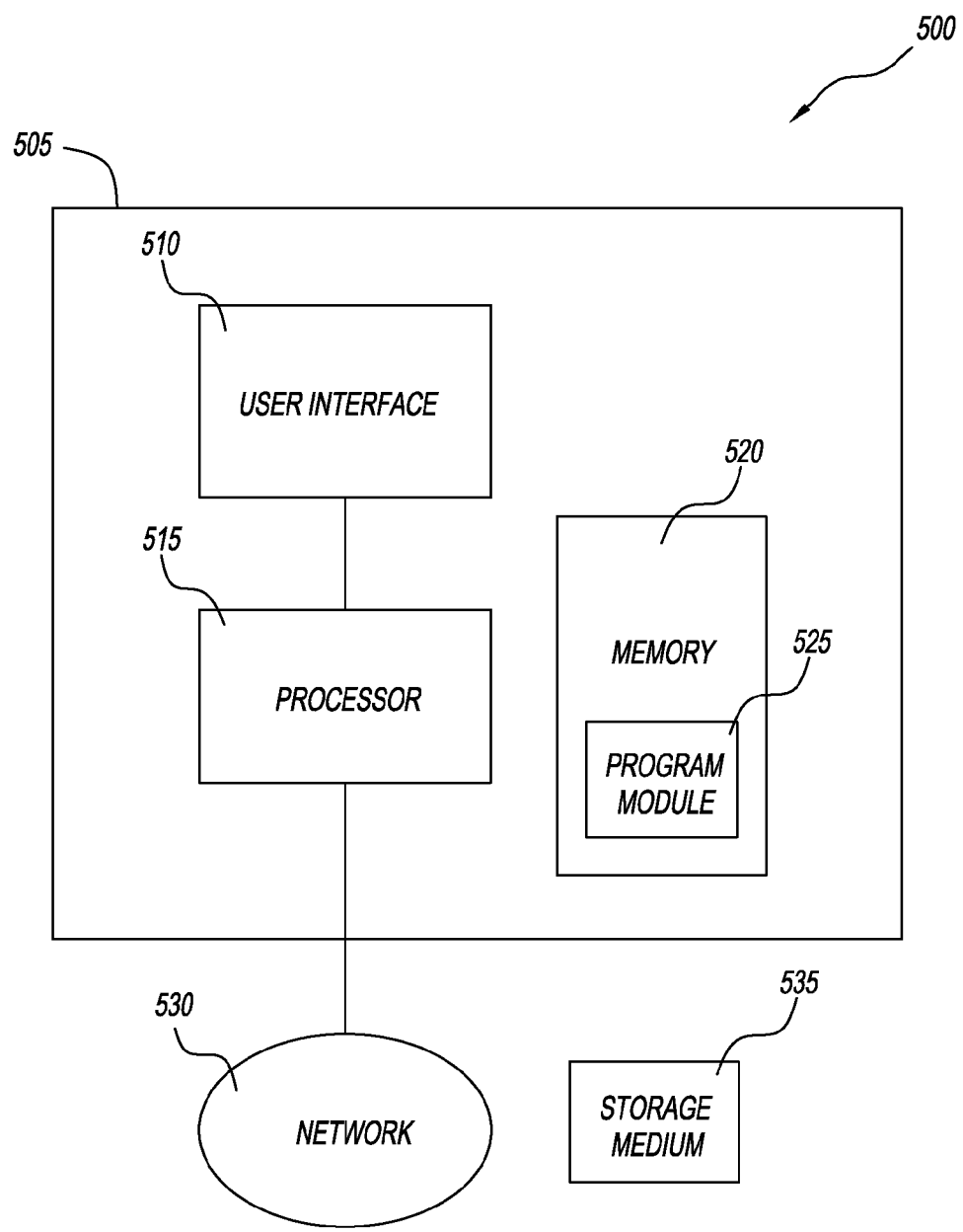
FIG. 5 is an illustration of a computer system used to implement the disclosed embodiment.

Referring to FIG. 5, computer system 5400, on which the present method and system can be implemented, includes a computer 505 coupled to a network 520, e.g., the Internet. Computer 505 includes a user interface 510, a processor 515, and a memory 525. Computer 505 may be implemented on a general-purpose microcomputer. Although computer 505 is represented herein as a stand-alone device, it is not limited to such, but instead can be coupled to other devices (not shown) via network 520.

Processor 515 is configured with logic circuitry that responds to and executes instructions. Memory 525 stores data and instructions for controlling the operation of processor 515. Memory 525 may be implemented in a random access memory (RAM), a read only memory (ROM), or a combination thereof. One component of memory 525 is a program module 530. Program module 530 contains instructions for controlling processor 515 to execute the methods described herein.

The term "module" is used herein to denote a functional operation that may be embodied either as a stand-alone component or as an integrated configuration of a plurality of sub-ordinate components. Thus, program module 530 may be implemented as a single module or as a plurality of modules that operate in cooperation with one another. Moreover, although program module 530 is described herein as being installed in memory 525, and therefore being implemented in software, it could be implemented in any of hardware (e.g., electronic circuitry), firmware, software, or a combination thereof.

User interface 510 includes an input device, such as a keyboard or speech recognition subsystem, for enabling a user to communicate information and command selections to processor 515. User interface 510 also includes an output device such as a display or a printer. A cursor control such as a mouse, track-ball, or joy stick, allows the user to manipulate a cursor on the display for communicating additional information and command selections to processor 515. Processor 515 outputs, to user interface 510, a result of an execution of the methods described herein. Alternatively, processor 515 could direct the output to a remote device (not shown) via network 520.

While program module 530 is indicated as already loaded in memory 525, it may be configured on a storage medium 535 for subsequent loading into memory 525. Storage medium 535 can be any conventional storage medium that stores program module 530 thereon in tangible form. Examples of storage medium 535 include a hard disk drive, a floppy disk, a compact disk, a magnetic tape, a read only memory, an optical storage media, universal serial bus (USB) flash drive, a digital versatile disc, or a zip drive. Alternatively, storage medium 535 can be a random access memory, or other type of electronic storage, located on a remote storage system and coupled to computer 505 via network 520.

It will be understood that the disclosure may be embodied in a computer readable non-transitory storage medium storing instructions of a computer program which when executed by a computer system results in performance of steps of the method described herein. Such storage media may include any of those mentioned in the description above.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. Further, while the embodiments described herein have been implemented by a digital processor running a series of computer instructions, other embodiments may be implemented using various hardware components and circuits. For example, circuits can be used to implement various counters, timers and comparators to implement the system and method described herein. The present disclosure is intended to embrace all such alternatives, modifications and variances that fall within the scope of the appended claims.

The terms "comprises" or "comprising" are to be interpreted as specifying the presence of the stated features, integers, steps or components, but not precluding the presence of one or more other features, integers, steps or components or groups thereof.

What is claimed is:

1. A computer system for monitoring security of a destination subnet, the computer system comprising:
    a memory; and
    a processor in communications with the memory, wherein the computer system is configured to perform a method, the method comprising:
        detecting, by the processor, Internet traffic messages that are recognized as anomalous attacks;
        counting by the processor, a number of the Internet traffic messages that are recognized as the anomalous attacks seen by a destination subnet within a current interval to provide a count;
        computing by the processor, over a plurality of intervals, a running average, wherein the running average comprises an average number of Internet traffic messages that are recognized as anomalous attacks per interval of the plurality of intervals;
        comparing the count to the running average;
        based on determining that the count is greater than a first multiple of the running average, providing an anomalous attack alarm for the destination subnet; and
        based on determining that the count is smaller than a second multiple of the running average, checking the memory for an anomalous attack alarm for the destination subnet, and clearing any anomalous attack alarm for the subnet located in the memory, wherein the second multiple is a smaller multiple than the first multiple.

2. The system of claim 1, further comprising updating the running average by smoothing, if the count is below the first multiple.

3. The system of claim 1, further comprising:
    storing records of anomalous attacks; and
    determining, by the processor, whether a record of an anomalous attack has been in the database for a predetermined period of time.

4. The system of claim 1, wherein the running average is a positive number.

5. The system of claim 1, wherein each of the anomalous attacks comprises at least one of: source spoofing or denial of service attacks.

6. The system of claim 1, wherein the running average is updated no more frequently than at a predefined interval.

7. The system of claim 2, wherein the smoothing is exponential smoothing.

8. The system of claim 3, wherein the running average is computed in a current time window, and when a record has been in the database for a time greater than predetermined period of time, that record is removed from the time window for purposes of computing the running average.

9. A system for monitoring Internet traffic, comprising:
    a memory comprising a database; and
    a processor in communications with the memory, wherein the computer system is configured to perform a method, the method comprising:
        detecting, by the processor, Internet traffic messages as anomalous attacks in a network flow;
        counting, by the processor, a number of Internet traffic messages that are detected as anomalous attacks seen by a destination subnet within a current interval to provide a count;
        computing, by the processor over a plurality of intervals, a running average, wherein the running average comprises an average number of Internet traffic messages that are detected as the anomalous attacks per interval of the plurality of intervals;
        comparing the count to the running average;
        based on determining that the count is greater than a first multiple of the running average, sending an anomalous attack alarm for the destination subnet to the database; and
        based on determining that count is smaller than a second multiple of the running average, checking the database for an anomalous attack alarm for the destination subnet, and based on locating the anomalous attack alarm for the destination subnet in the database, clearing the located anomalous attack alarm for the destination subnet from the database, wherein the second multiple is a smaller multiple than the first multiple.

10. The system of claim 9, further comprising: updating the running average by smoothing, if the count is a third multiple, wherein the third multiple is less than the first multiple of the running average.

11. The system of claim 9, wherein each of the anomalous attacks comprises at least one of source spoofing or denial of service attacks.

12. The system of claim 9, wherein the running average is updated no more frequently than at a predefined interval.

13. The system of claim 9, wherein the running average is a positive number.

14. The system of claim 10, wherein the smoothing is exponential smoothing.

15. The system of claim 10, wherein the detecting further comprises storing records in the database for Internet traffic message as anomalous attacks in the network flow.

16. The system of claim 15, further comprising:
    determining, by the processor, that a record of the records in the database has been in the database for a predetermined period of time and
    based on the determining, removing, by the processor, the record from a window used to compute the running average.

17. A method for monitoring Internet traffic comprising:
    obtaining, by a processor, a network flow and detecting anomalous attacks in the network flow;
    counting, by the processor, a number of Internet traffic messages in the network flow that are detected as anomalous attacks seen by a destination subnet within a current interval and providing a count;
    computing, by the processor, over a plurality of intervals, a running average, wherein the running average comprises an average number of messages that are detected as anomalous attacks per interval of the plurality of intervals;
    comparing the count to the running average;

based on determining that the count is greater than a first multiple of the running average, providing an anomalous attack alarm for the destination subnet; and based on determining that the count is smaller than a second multiple of the running average, checking the memory for an anomalous attack alarm for the destination subnet, and clearing any anomalous attack alarm for the subnet located in the memory, wherein the second multiple is a smaller multiple than the first multiple.

18. The method of claim 17, wherein if the count is a less than the first multiple of the running average, updating the running average using smoothing.

19. The method of claim 17, wherein the running average is updated no more frequently than at a predefined interval.

20. The method of claim 17, further comprising setting the running average to be a positive number.

21. The method of claim 17, further comprising: storing in a database records of anomalous attacks, and determining whether a record of an anomalous attack has been in the database for a predetermined period of time.

22. The method of claim 17, wherein each of the anomalous attacks comprises at least one of: source spoofing or denial of service attacks.

23. The method of claim 18, wherein the smoothing is exponential smoothing.

24. The method of claim 21, further comprising removing a record from a window used to compute the running average when the record has been in the database for a time greater than the predetermined period of time.

25. A computer readable non-transitory storage medium storing instructions of a computer program which when executed by a computer system results in performance of a method, comprising:
  obtaining, by a processor, a network flow and detecting anomalous attacks in the network flow;
  counting, by the processor, a number of Internet traffic messages in the network flow that are detected as anomalous attacks seen by a destination subnet within a current interval and providing a count;
  computing, by the processor, over a plurality of intervals, a running average, wherein the running average comprises an average number of messages that are detected as anomalous attacks per interval of the plurality of intervals;
  comparing the count to the running average;
  based on determining that the count is greater than a first multiple of the running average, providing an anomalous attack alarm for the destination subnet; and
  based on determining that the count is smaller than a second multiple of the running average, checking the memory for an anomalous attack alarm for the destination subnet, and clearing any anomalous attack alarm for the subnet located in the memory, wherein the second multiple is a smaller multiple than the first multiple.

26. The computer readable non-transitory storage medium of claim 25, wherein each of the anomalous attacks comprises at least one of: source spoofing or denial of service attacks.

* * * * *

UNITED STATES PATENT AND TRADEMARK OFFICE
CERTIFICATE OF CORRECTION

PATENT NO. : 9,130,982 B2
APPLICATION NO. : 13/916693
DATED : September 8, 2015
INVENTOR(S) : Gottlieb et al.

Page 1 of 1

It is certified that error appears in the above-identified patent and that said Letters Patent is hereby corrected as shown below:

Title Page

In the Assignee (73): Insert -- KDDI CORPORATION, TOKYO, JAPAN --

Signed and Sealed this
Fifteenth Day of March, 2016

Michelle K. Lee
*Director of the United States Patent and Trademark Office*